US008283820B2

(12) United States Patent
Christoffersen

(10) Patent No.: US 8,283,820 B2
(45) Date of Patent: Oct. 9, 2012

(54) HIGH CURRENT CONNECTOR

(75) Inventor: Viggo Kofod Christoffersen, Ringkøbing (DK)

(73) Assignee: Vestas Wind Systems A/S, Aarhus N (DK)

(*) Notice: Subject to any disclaimer, the term of this patent is extended or adjusted under 35 U.S.C. 154(b) by 360 days.

(21) Appl. No.: 12/524,405

(22) PCT Filed: Jan. 25, 2008

(86) PCT No.: PCT/EP2008/050881
§ 371 (c)(1),
(2), (4) Date: Nov. 23, 2009

(87) PCT Pub. No.: WO2008/090214
PCT Pub. Date: Jul. 31, 2008

(65) Prior Publication Data

US 2010/0102658 A1 Apr. 29, 2010

(30) Foreign Application Priority Data

Jan. 26, 2007 (DK) ................................ 2007 00132

(51) Int. Cl.
*H02K 11/00* (2006.01)

(52) U.S. Cl. ........................................... 310/71; 310/52

(58) Field of Classification Search .................... 310/71, 310/52; 439/388, 762, 927, 756, 805, 777
See application file for complete search history.

(56) References Cited

U.S. PATENT DOCUMENTS

| | | | | |
|---|---|---|---|---|
| 1,507,936 | A | 9/1924 | Schmitt | |
| 3,792,403 | A * | 2/1974 | Bullock | 337/66 |
| 4,033,654 | A | 7/1977 | Ross | |
| 4,118,097 | A * | 10/1978 | Budnick | 439/387 |
| 4,810,213 | A | 3/1989 | Chabot | |
| 5,597,331 | A * | 1/1997 | Gable et al. | 439/754 |
| 5,915,758 | A | 6/1999 | Alfiero | |
| 5,925,947 | A * | 7/1999 | Kajiwara et al. | 310/64 |
| 6,053,779 | A * | 4/2000 | Liang | 439/756 |
| 6,830,490 | B2 * | 12/2004 | Murakami et al. | 439/755 |
| 6,902,444 | B1 * | 6/2005 | Shannon, Jr. | 439/756 |
| 2003/0198867 | A1 * | 10/2003 | Kim | 429/178 |
| 2004/0256928 | A1 * | 12/2004 | Kondo et al. | 310/68 D |

FOREIGN PATENT DOCUMENTS

| | | |
|---|---|---|
| DE | 103 60 614 A1 | 7/2004 |
| EP | 0753908 | 1/1997 |
| EP | 1 119 061 A2 | 7/2001 |
| FR | 2293073 | 6/1976 |
| GB | 202215 | 8/1923 |

OTHER PUBLICATIONS

International Search Report, Danish priority patent application No. PA 2007/00132.

* cited by examiner

*Primary Examiner* — Quyen Leung
*Assistant Examiner* — Naishadh Desai
(74) *Attorney, Agent, or Firm* — Patterson & Sheridan, LLP

(57) ABSTRACT

The invention provides a joint (1) for joining a first electrical conductor to a second electrical conductor. The joint comprises an assembly member (3), an adapting member (2), an indentation (5*a*), an elastically deformable multipoint connection member (4), and an assembly structure (7, 8, 5*b*, 9). The assembly member is electrically conductive and comprises at least a first seat (5) and has a fastening structure (5*b*) forming part of the assembly structure. The adapting member comprises a first portion being attachable to the first seat and a second portion being attachable to an end portion of the first electrical conductor. The first portion comprises a compliant structure forming part of the assembly structure and being cooperative with the fastening structure to facilitate fixing of the adapting member to the assembly member.

36 Claims, 3 Drawing Sheets

HIGH CURRENT CONNECTOR

PRIORITY CLAIM

This is a U.S. national stage of application No. PCT/EP2008/050881, filed on Jan. 25, 2008. Priority is claimed on the following application(s): Country: Denmark, Application No.: PA200700132, Filed: Jan. 26, 2007, the content of which is incorporated here by reference.

TECHNICAL FIELD

The present invention relates to a joint for joining electrical conductors, e.g. electrical cables for high current in a wind turbine.

BACKGROUND OF THE INVENTION

Traditionally wind turbine generators comprise a rotor and a stator. The wind turbine blades are connected to the rotor in the generator, e.g. through a gear. When the blades rotate, the rotor is rotated and high current electricity is produced.

In order to be able to control the rotor current and the generator output, the generator is often equipped with a slip ring unit. The slip rings are connected to their respective rotor coils by a number of cables, often made by copper. Traditionally, the cables are lead in a hollow driving shaft. To keep the cables in place, an isolating material fills the hollow shaft.

In general, heating of the cables due to electrical resistance may cause problems or it may define an upper limit of the performance of the turbine. When isolating the cables in order to keep them in place, the generated heat is practically unable to be released to the surrounding space. This often results in overheating and spoiling of the strands in the cables, and due to vibration, the strands may break, thus leading to damage of the copper cables.

SUMMARY OF THE INVENTION

It is an object of embodiments of the present invention to provide an improved joint for joining electrical conductors, such as high current cables of a wind turbine.

In a first aspect, the invention provides a joint for joining a first electrical conductor to a second electrical conductor, the joint comprising an assembly member, an adapting member, an indentation, an elastically deformable multipoint connection member, and an assembly structure,

- the assembly member being electrically conductive and comprising at least a first seat and having a fastening structure forming part of the assembly structure,
- the adapting member comprising a first portion being attachable to the first seat and a second portion being attachable to an end portion of the first electrical conductor, the first portion comprising a compliant structure forming part of the assembly structure and being cooperative with the fastening structure to facilitate fixing of the adapting member to the assembly member,
- the indentation being provided in at least one of the assembly member and the adapting member, and
- the elastically deformable multipoint connection member being arrangeable in the indentation between the assembly member and the adapting member to form a plurality of connection points with electrical conductivity between the adapting member and the assembly member, wherein both thermal and electrical conductivity is provided between the assembly member and the adapting member via direct contact between the assembly member and the adapting member, through the elastically deformable multipoint connection member, and via the assembly structure.

Due to the plurality of connection points between the adapting member and the assembly member, the electricity can be conducted via a plurality of electrical contact points from the electrical conductor to the assembly member. Having a plurality of small contact points, a large surface pressure can be obtained at each of the contact point, thus leading to good electrical connectivity.

Due to the direct contact between the adapting member and the assembly member, the assembly member may function as a heat sink which draws out thermal energy of the adapting member and thus of the end of the electrical conductor. In this way, not only good electrical connectivity but also good thermal conductivity is established.

The adapting member may form an end face and a sidewall extending from the end face to form a tubular sleeve in which an end of the first electrical conductor can be located and fixed e.g. by crimping. It should be understood, that by tubular sleeve is in this connection meant a hollow element with an elongated shape. The shape may be non-uniform. The outer geometry may be of a rectangular shape, a circular shape, an oval shape or any other shape. The inner geometry may be different from the outer shape, thus defining a tubular sleeve in the form of an elongated ring of an arbitrary shape.

The assembly structure is adapted to facilitate fixing of the adapting member to the assembly member, as the fastening structure of the assembly member forms part of the assembly structure and the compliant structure of the adapting member also forms part of the assembly structure.

At least one of the compliant structure and the fastening structure may be constituted by an aperture by which the assembly member and the adapting member can be assembled with an assembly means extending through the aperture. Thus, the assembly structure may comprise an assembly means, a fastening structure and a compliant structure.

As an example, the assembly means may be an elongated member which can be inserted through a hole, e.g. the fastening structure of the assembly member and attached to the compliant structure of the adapting member. The compliant structure may be a threaded portion of the adapting member. Alternatively, the compliant structure may comprise a nut allowing for the engagement.

In one embodiment, both the compliant structure and the fastening structure may be constituted by apertures which can be aligned with each other to facilitate fixing of the assembly member and the adapting member by use of an assembly means extending through both of the apertures. In this embodiment, the assembly means may be an elongated member which can be inserted through both the fastening structure and the compliant structure. The assembly means may comprise one or more threaded portions allowing for engagement with a threaded portion of at least one of the fastening structure and the compliant structure.

In an alternative embodiment, the assembly member may be an elongated member comprising a protrusion at one end, whereas the other end may be deformed when inserted through the fastening structure and the compliant structure. Thereby fixing the adapting member to the assembly member and thus to the first electrical conductor.

If the assembly means comprises at least one threaded portion, the adapting member may be pressed against the assembly member as in a traditional screw joint. By pressing the adapting member against the assembly member, good contact is established between them, thus facilitating cooling of the first electrical conductor and facilitating electrical contact.

The assembly means may be arranged so that good thermal conductivity is provided via the assembly means, e.g. by ensuring direct contact between the electrical conductor and the assembly means and direct contact between the assembly means and the assembly member. Thus, the assembly means and the assembly member may function as a heat sink for the first electrical conductor.

In particular, the assembly means may provide pressing of the end-face of the adapting member against the assembly member, and in one embodiment, the joint may facilitate that a major portion of the sidewall is in free air, i.e. not in direct contact with the assembly member so that the sidewall can be cooled by the air in the surrounding space. In this particular embodiment, at least 80% or even at least 90% of the sidewall should be free.

The assembly means may be made of a good thermally conducting material in order to further improve cooling the first electrical conductor. Thus, the assembly means may be made from a material selected from a group consisting of: plated and un-plated copper, aluminium, steel alloys, and alloys containing copper and/or aluminium.

In one embodiment, the first portion may be symmetrical around a centre axis of the adapting member. The sidewall may be formed substantially as a cylinder which may be sized to accommodate an end part of the first electrical conductor. When the electrical conductor is accommodated in the adapting member, the adapting member may be attached to the end thereof e.g. by crimping.

A symmetrical first portion may facilitate fixing of the adapting member to the assembly member, as the first seat may comprise a recess for receiving the first portion at an arbitrary orientation around the centre axis.

In preferred embodiments, the electrical conductor comprises a solid electrical cable, e.g. a cable made of copper. Though, other materials may also be used.

In order to ensure thermal convection from the adapting member, it may comprise an irregular heat conductive structure. By irregular structure is meant that the adapting member has an increased surface area compared to an adapting member having an even surface area.

The irregular structure may comprise a wave shaped surface pattern for increasing thermal convection to a surrounding space. Alternatively or additionally, the irregular structure may comprise cooling fins, cooling knobs, cooling ribs, cooling depressions, or other similar elements increasing the surface area of the adapting member. By increasing the surface area of the adapting member, the thermal convection here from can be increased. Furthermore, cooling air may be supplied from the nacelle to the joint.

In one embodiment, the sidewall has a substantially circular cross-sectional shape with a radius r and a length h, the surface area being at least 1.5 times the surface area of a regular cylinder, i.e. a surface area of at least 1.5×2×r×phi×h.

The multipoint connection member is arrangeable in the indentation which is provided in at least one of the assembly member and the adapting member.

In one embodiment, the multipoint connection member may be in contact with the end face of the adapting member, thus facilitating good electrical contact between the adapting member and the assembly member. Furthermore, the multipoint connection member may be made in one piece, thus simplifying joining of the electrical conductors.

In order to improve the good electrical contact between the multipoint connection member and the adapting member on the one hand and the assembly member on the other hand, the multipoint connection member may comprise a helical spring, thus providing a plurality of connection points between the adapting member and the assembly member.

If the multipoint connection member is arranged so that it is in contact with the end face of the adapting member, an assembly means comprising at least one threaded portion may facilitate that the assembly member and the adapting member are pressed against each other, and thus that the multipoint connection member is compressed during use of the joint. The assembly structure may e.g. be adapted to provide a compression force in the range of at least 1 N such as between 1 and 20 N, such as between 2 and 15 N, such as between 3 and 10 N.

As an example, the assembly means can be tightened in a regular "bolt connection manner" to re-establish a specific contact pressure between the multipoint connection member and the assembly member if the multipoint connection member over time has become thinner by the compression and the contact pressure therefore has been reduced.

In order to be able to connect a second electrical conductor to the first electrical conductor, the assembly member may comprise a second seat for connection of an additional electrical conductor.

To lead the current from the electromagnets of the rotor, the rotor shaft is traditionally provided with a number of slip rings which are connected to their respective rotor coils by a number of relatively thick electrical conductors. These electrical conductors are usually made of copper or another material with excellent current conducting qualities. The rotor shaft, on the other hand, is usually made of steel in order to withstand the large loads it is exposed to.

The expansion coefficient of the electrical conductors is therefore usually larger than the expansion coefficient of the shaft, and e.g. due to losses the electrical conductors become very hot during use. This means that the electrical conductors expand and contract more than the shaft leading to relative motion between the electrical conductors and the shaft and other fixed neighbouring components which do not expand correspondingly.

This relative motion is very disadvantageous as the electrical conductors' insulation might be damaged due to rubbing. Furthermore, the electrical conductors may break loose, which can lead to short circuit being damaging to the electrical conductors, the generator and other components. Thus, the second seat may form a passage for receiving the additional electrical conductor in a sliding joint in order to allow for movement of the electrical conductor.

In order to improve the possibility of cooling the electrical conductors, the assembly member may comprise an irregular heat conductive surface structure, thus increasing the surface area of the assembly member. As an example, the irregular surface structure may comprise a finned outer surface.

5-30 percent, such as 10-20 percent of a total surface area of the adapting member may be in direct contact with the assembly member. Increasing the contact area may facilitate release of the heat generated in the electrical conductors, due to thermal conductivity between adapting member and the assembly member.

The adapting member may be made from a material selected from a group consisting of: plated and un-plated copper, aluminium, and alloys thereof. Thus, the adapting member may be made of a good thermally conducting material in order to facilitate cooling the first electrical conductor.

In a second aspect, the invention provides a joint for joining a first electrical conductor to a second electrical conductor, the joint comprising an assembly member, an adapting member, and an assembly structure, the assembly member being electrically conductive and comprising at least a first seat and having a fastening structure forming part of the assembly structure, and the adapting member comprising a first portion being attachable to the first seat and a second portion being attachable to an end portion of the first electrical conductor, the first portion comprising a compliant structure forming part of the assembly structure and being cooperative with the fastening structure to facilitate fixing of the adapting member to the assembly member, wherein both thermal and electrical conductivity is provided between the assembly member and the adapting member via direct contact between the assembly member and the adapting member and via the assembly structure.

It should be understood, that the above-mentioned features of the first aspect of the invention may also be applicable to the joint of the second aspect of the invention.

Due to the direct contact between the adapting member and the assembly member, the assembly member may function as a heat sink which draws out thermal energy of the adapting member and thus of the end of the electrical conductor.

Furthermore, an irregular heat conductive structure of the adapting member may lead to improved heat transfer from the electrical conductor due to the increased surface area of the adapting member. By irregular structure is meant that the adapting member has an increased surface area compared to an adapting member having an even surface area.

In order to increase thermal convection to a surrounding space even further, the irregular heat conductive structure may comprise a wave shaped surface pattern. Alternatively or additionally, the irregular structure may comprise cooling fins, cooling knobs, cooling ribs, cooling depressions, or other similar elements increasing the surface area of the adapting member.

In a third aspect, the invention provides a joint for joining a first electrical conductor to a second electrical conductor, the joint comprising an assembly member and an assembly structure, the assembly member being electrically conductive and comprising a first seat and having a fastening structure forming part of the assembly structure, and the first electrical conductor having an elongated body with a conductor end face, the first electrical conductor comprising a first conductor portion being attachable to the first seat, the first conductor portion comprising a compliant structure forming part of the assembly structure and being cooperative with the fastening structure to facilitate fixing of the first electrical conductor to the assembly member, wherein both thermal and electrical conductivity is provided between the assembly member and the first electrical conductor via direct contact between the assembly member and the first electrical conductor and via the assembly structure.

Due to the direct contact between the first electrical conductor and the assembly member, the assembly member may function as a heat sink which draws out thermal energy of the first electrical conductor.

The assembly member may substantially only contact the electrical conductor at the conductor end face.

It should be understood, that the above-mentioned features of the first and second aspects of the invention may also be applicable to the joint of the third aspect of the invention.

As mentioned previously, the joint may in particular be useful as a combined electrical and thermal conductor for a generator in which a thermal cable isolation caused by a fixating body in a rotor may cause overheating. In a fourth aspect, the invention therefore provides an electrical generator comprising a stator and a rotor which rotates with a rotor axle relative to the stator, the rotor being electrically connected to a grid via a conduction path extending between a rotor winding and a slip ring, the generator comprising a joint according to any of the first, second and third aspects of the invention.

As an example, the connection may, in accordance with the second aspect of the invention, comprise a joint which in a most simple embodiment comprises an adapting member which comprises an irregular heat conductive structure e.g. with a number of cooling fins. Such an adapting member could be attached to one end of an electrical conductor which, at its opposite end is connected to the rotor winding. The adapting member is then connected to an assembly member by which an electrical connection is established to the slip ring.

The joint is inserted in the conduction path between the rotor winding and the slip ring and thereby allows the cable in an efficient way to conduct heat away from the generator.

In such a case, the generator may be designed with a section of the conduction path extending through a body of a damping or fixating material inside the rotor, and the increased thermal isolation of the conduction path may be counteracted by the thermal conductivity of the joint. In this case, the joint may advantageously be arranged between the body and the slip ring.

Correspondingly, the invention in a fifth aspect, provides a method of cooling a first conductor which extends from a rotor winding in an electrical generator and partly through a body of a damping or fixating material inside a rotor of the generator. The method comprises the step of attaching the first conductor to a joint according to any of the first, second and third aspects of the invention. A conduction path is thereby established via the joint from the rotor winding to a slip ring.

In a sixth aspect, the invention provides a method of joining a first electrical conductor to a second electrical conductor, the method comprising the steps of:

providing an assembly member being electrically conductive and comprising a first seat and having a fastening structure forming part of an assembly structure;

providing a first electrical conductor having an elongated body with a conductor end face, the first electrical conductor comprising a first conductor portion being attachable to the first seat, the first conductor portion comprising a compliant structure forming part of the assembly structure and being cooperative with the fastening structure to facilitate fixing of the first electrical conductor to the assembly member;

attaching the first electrical conductor to the assembly member by use of the assembly structure so that an end face of the first electrical conductor is pressed against the assembly member; and attaching the second electrical conductor to the assembly member.

It should be understood, that the above-mentioned features of the first, second, and third aspects of the invention may also be applicable to the method of the forth aspect of the invention.

BRIEF DESCRIPTION OF THE DRAWINGS

Embodiments of the invention will now be further described with reference to the drawings, in which.

DETAILED DESCRIPTION

Figure 1:
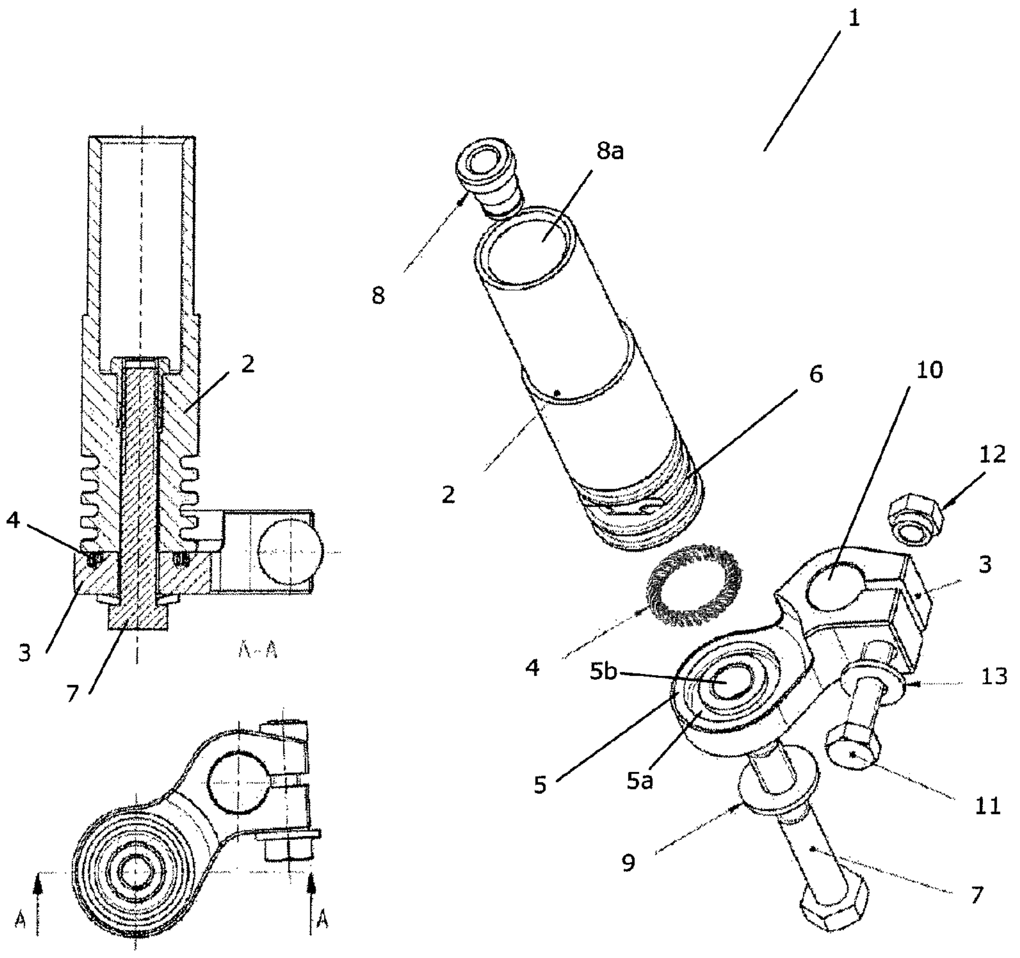
FIG. 1 illustrates a joint according to the invention.

FIG. 1 illustrates a joint 1 for joining two electrical conductors, such as electrical cables (not shown). The joint 1 comprises an adapting member 2 which is attachable to an end portion of a first electrical conductor. Furthermore, the joint 1 comprises an assembly member 3 forming a joint between the first electrical conductor and another electrical conductor. Additionally, the joint 1 comprises an elastically deformable multipoint connection member 4 forming a plurality of connection points between the adapting member 2 and the assembly member 3 to provide electrical conductivity there between. The assembly member 3 comprises a first seat 5 adapted to receive the adapting member 2 to established contact between the adapting member 2 and the assembly member 3.

An end of the first electrical conductor (not shown) can be located in the adapting member 2 and can be fixed by crimping.

As illustrated in FIG. 1, the adapting member 2 comprises an irregular heat conductive structure in the form of a wave shaped surface pattern 6 for increasing thermal convection to the surrounding space.

When assembled, the multipoint connection member 4, in this embodiment a helical spring, is in contact with the end of the adapting member 2, thus facilitating good electrical contact between the adapting member 2 and the assembly member 3 due to the large number of small contact points each being exposed to a large surface pressure. The multipoint connection member 4 is located in an indentation 5*a* in the first seat 5.

Furthermore, the assembly member 3 comprises assembly means 7 to be able to press the adapting member 2 against the assembly member 3. In the illustrated embodiment, the assembly means comprises a threaded element 7 in the form of a screw which in the assembled joint is engaged with a nut 8 positioned in the tubular shaped adapting member 2. The assembly means 7 and the nut 8 forms part of an assembly structure further comprising a washer 9.

To be able to insert the assembly means 7 through the assembly member 3, the assembly member 3 comprises a fastening structure which, in this embodiment is formed by an aperture 5*b* formed in the assembly member 3.

Likewise the adapting member 2 comprises a compliant structure to allow for insertion of the assembly means. In the present embodiment, the compliant structure comprises the nut 8 and the aperture 8*a* in the adapting member 2. When aligning the assembly aperture 5*b* and the adapting aperture 8*a*, the assembly means 7 can be inserted through both apertures 5*b*, 8*a* allowing for fixing of the adapting member 2 to the assembly member 3.

In order to be able to join two electrical conductors, the joint 1 further comprises a second seat 10 for connection of a second electrical conductor (not shown). The second electrical conductor may be secured to the joint 1 by the use of a second screw 11, a second nut 12 and a second washer 13.

Figure 2:
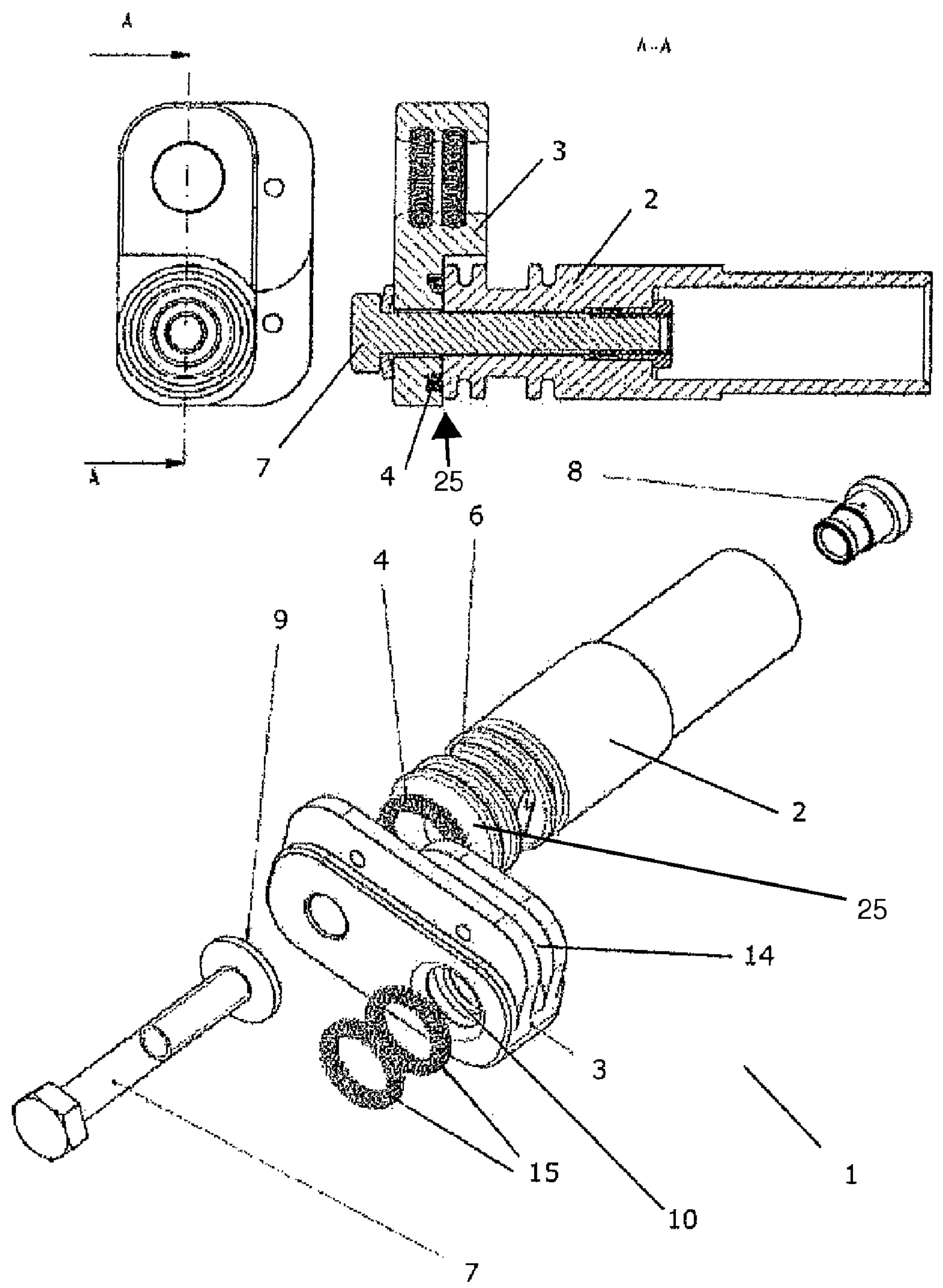
FIG. 2 illustrates another joint according to the invention.

FIG. 2 illustrates another joint 1 for joining two electrical conductors, such as electrical cables (not shown). The joint 1 comprises an adapting member 2 which is attachable to an end portion of a first electrical conductor. Furthermore, the joint 1 comprises an assembly member 3 forming a joint between the first electrical conductor and another electrical conductor. Additionally, the joint 1 comprises an elastically deformable multipoint connection member 4 forming a plurality of connection points between the adapting member 2 and the assembly member 3 to provide electrical conductivity there between. The assembly member 3 comprises a first seat (not shown) adapted to receive the adapting member 2 in order to established contact between the adapting member 2 and the assembly member 3.

A conductor end face of the first electrical conductor (not shown) can be located in the adapting member 2 and can be fixed by crimping.

As illustrated in FIG. 2, the adapting member 2 comprises an irregular heat conductive structure in the form of a wave shaped surface pattern 6 for increasing thermal convection to the surrounding space. Furthermore, the assembly device 3 comprises an irregular heat conductive surface structure in the form of a finned outer surface 14 also facilitating cooling of the electrical conductors and the joint 1.

When assembled, the multipoint connection member 4, in this embodiment a helical spring, is in contact with the end face 25 of the adapting member 2, thus facilitating good electrical contact between the adapting member 2 and the assembly member 3 due to the large number of small contact points each being exposed to a large surface pressure.

Furthermore, the assembly member 3 comprises assembly means 7 to press the adapting member 2 against the assembly member 3. In the illustrated embodiment, the assembly means comprises a threaded element 7 in the form of a screw which in the assembled joint is engaged with a nut 8 positioned in the tubular shaped adapting member 2. The assembly means further comprises a washer 9.

In order to be able to join two electrical conductors, the joint 1 further comprises a second seat 10 for connection of a second electrical conductor in a sliding joint. In this embodiment, two helical springs 15 are used when joining the second conductor.

Figure 3:
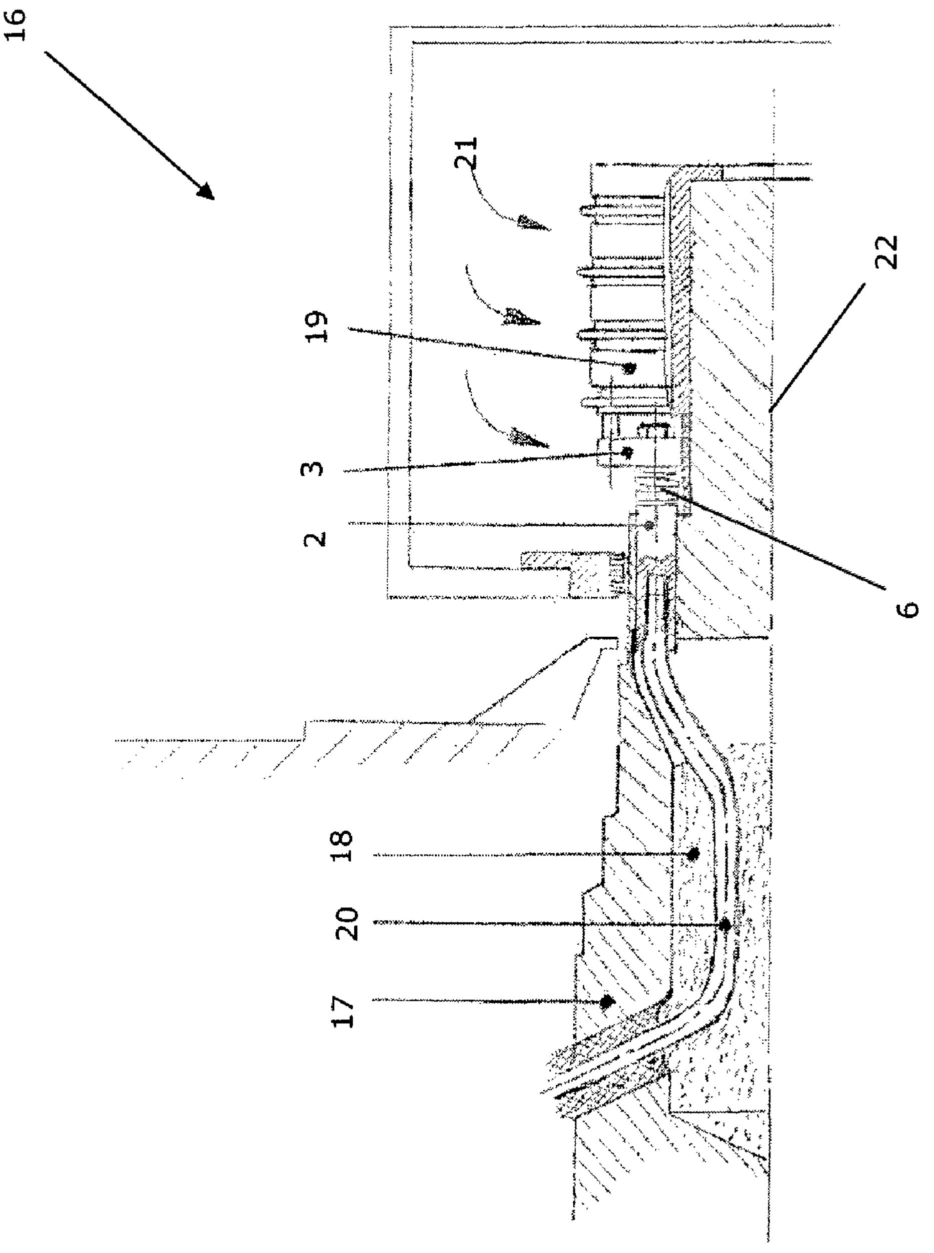
FIG. 3 illustrates parts of a generator comprising a joint.

FIG. 3 illustrates parts of a generator 16 comprising a joint of the above described kind. The generator 16 comprises a stator (not shown) and a rotor (not shown) which rotates with a rotor axle 17 relative to the stator. The rotor is electrically connected to a grid via a conduction path extending between a rotor winding (not shown) and a slip ring 19. A conductor 20 is fixed in the conduction path by a damping or fixating material 18.

The arrows 21 illustrate cooling of the slip ring 19 by use of air. Furthermore, the dotted line 22 is a symmetry axis.

The invention claimed is:

1. A joint for joining a first electrical conductor to a second electrical conductor, the joint comprising an assembly member, an adapting member, an indentation of a surface, an elastically deformable multipoint connection member, and an assembly structure, the assembly member being electrically conductive and comprising at least a first seat and a fastening structure forming part of the assembly structure, the adapting member comprising a first portion being attachable to the first seat and a second portion being attachable to an end portion of the first electrical conductor, the first portion comprising a compliant structure forming part of the assembly structure and being cooperative with the fastening structure to facilitate fixing of the adapting member to the assembly member, the adapting member having an elongated body with an end face, the surface indentation being a characteristic of at least one of: a surface of the assembly member and the end face of the adapting member, and the elastically deformable multipoint connection member being arrangeable in the surface indentation and is between the assembly member and the end face of the adapting member to form a plurality of connection points with electrical conductivity between the adapting member and the assembly member, wherein both thermal and electrical conductivity is provided between the assembly member and the adapting member via direct contact between the assembly member and the adapting member, through the elastically deformable multipoint connection member, and via the assembly structure.

2. The joint according to claim 1, wherein the assembly structure being adapted to press the end face against the assembly member.

3. The joint according to claim 2, wherein the multipoint connection member is in contact with the end face.

4. The joint according to claim 1, wherein at least one of the compliant structure and the fastening structure are defined by a surface forming an aperture by which the assembly member and the adapting member can be assembled with an assembly means extending through the aperture.

5. The joint according to claim 4, wherein both the compliant structure and the fastening structure are defined by surfaces forming apertures which can be aligned with each other to facilitate fixing of the assembly member and the adapting member by use of an assembly means extending through both of the apertures.

6. The joint according to claim 1, wherein the first portion is symmetrical around a centre axis.

7. The joint according to claim 6, wherein the first seat comprises a recess for receiving the first portion at an arbitrary orientation around the centre axis.

8. The joint according to claim 1, wherein the adapting member comprises an irregularly shaped heat conductive structure.

9. The joint according to claim 8, wherein the irregularly shaped structure comprises a wave shaped surface pattern for increasing thermal convection to a surrounding space.

10. The joint according to claim 1, wherein the multipoint connection member comprises a helical spring.

11. The joint according to claim 1, wherein the assembly member comprises a second seat for connection of an additional electrical conductor.

12. The joint according to claim 11, wherein the second seat forms a passage for receiving the additional electrical conductor in a sliding joint.

13. The joint according to claim 1, wherein the assembly member comprises an irregularly shaped heat conductive surface structure.

14. The joint according to claim 13, wherein the irregularly shaped surface structure comprises a finned outer surface.

15. The joint according to claim 1, wherein a range between 5 and 30 percent of a total surface area of the adapting member is in direct contact with the assembly member.

16. A joint for joining a first electrical conductor to a second electrical conductor, the joint comprising an assembly member, an adapting member, and an assembly structure, the assembly member being electrically conductive and comprising at least a first seat and a fastening structure forming part of the assembly structure, and the adapting member comprising a first portion being attachable to the first seat and a second portion being attachable to an end portion of the first electrical conductor, the first portion comprising a compliant structure forming part of the assembly structure and being cooperative with the fastening structure to facilitate fixing of the adapting member to the assembly member, wherein both thermal and electrical conductivity is provided between the assembly member and the adapting member via direct contact between the assembly member and the adapting member and via the assembly structure, wherein the adapting member forms an end face and a sidewall extending from the end face, the assembly structure being adapted to press the end face against the assembly member.

17. The joint according to claim 16, wherein at least one of the compliant structure and the fastening structure is defined by a surface forming an aperture by which the assembly member and the adapting member can be assembled with an assembly means extending through the aperture.

18. The joint according to claim 17, wherein both the compliant structure and the fastening structure are defined by surfaces forming apertures which can be aligned with each other to facilitate fixing of the assembly member and the adapting member by use of an assembly means extending through both of the apertures.

19. The joint according to claim 16, wherein the first portion is symmetrical around a centre axis.

20. The joint according to claim 19, wherein the first seat comprises a recess for receiving the first portion at an arbitrary orientation around the centre axis.

21. The joint according to claim 16, wherein the adapting member comprises an irregularly shaped heat conductive structure.

22. The joint according to claim 21, wherein the irregularly shaped structure comprises a wave shaped surface pattern for increasing thermal convection to a surrounding space.

23. The joint according to claim 16, wherein the assembly member comprises a second seat for connection of an additional electrical conductor.

24. The joint according to claim 23, wherein the second seat forms a passage for receiving the additional electrical conductor in a sliding joint.

25. The joint according to claim 16, wherein the assembly member comprises an irregularly shaped heat conductive surface structure.

26. The joint according to claim 25, wherein the irregularly shaped surface structure comprises a finned outer surface.

27. The joint according to claim 16, wherein a range between 5 and 30 percent of a total surface area of the adapting member is in direct contact with the assembly member.

28. A joint for joining a first electrical conductor to a second electrical conductor, the joint comprising an adapting member, assembly member, and an assembly structure, the assembly member being electrically conductive and comprising a first seat and a fastening structure forming part of the assembly structure, and the adapting member having an elongated body with an end face, the adapting member comprising a first conductive portion being attachable to the first seat, the first conductive portion comprising a compliant structure forming part of the assembly structure, the compliant structure being cooperative with the fastening structure to facilitate fixing of the adapting member to the assembly member, wherein both thermal and electrical conductivity is provided between the assembly member and the adapting member via (i) direct contact between the assembly member and the adapting member and (ii) via the assembly structure, and wherein the assembly member substantially only contacts the adapting member at the end face.

29. The joint according to claim 28, wherein at least one of the compliant structure and the fastening structure is defined by a surface forming an aperture by which the assembly member and the adapting member can be assembled with an assembly means extending through the aperture.

30. The joint according to claim 29, wherein both the compliant structure and the fastening structure are defined by surfaces forming apertures which can be aligned with each other to facilitate fixing of the assembly member and the adapting member by use of an assembly means extending through both of the apertures.

31. An electrical generator comprising a stator and a rotor which rotates with a rotor axle relative to the stator, the rotor being electrically connected to a grid via a conduction path extending between a rotor winding and a slip ring, the generator comprising a joint according to claim 1 inserted in the conduction path between the rotor winding and the slip ring.

32. The electrical generator according to claim 31, wherein at least a section of the conduction path extends through a body of a damping or fixating material inside the rotor, and wherein the joint is arranged between the body and the slip ring.

33. A method of cooling a first conductor which extends from a rotor winding in an electrical generator and partly through a body of a damping or fixating material inside a rotor of the generator, the method comprising the step of attaching the first conductor to a joint according to claim 1 and thereby establishing a conduction path via the joint from the rotor winding to a slip ring.

34. A method of joining a first electrical conductor to a second electrical conductor, the method comprising the steps of:

providing an assembly member being electrically conductive and comprising a first seat and a fastening structure forming part of an assembly structure;

providing an adapting member having an elongated body with an end face, the adapting member comprising a first conductive portion being attachable to the first seat, the first conductive portion comprising a compliant structure forming part of the assembly structure, the compliant structure being cooperative with the fastening structure to facilitate fixing of the adapting member to the assembly member;

attaching the adapting member to the assembly member by use of the assembly structure so that the end face of the adapting member is pressed against the assembly member;

attaching the first electrical conductor to the adapting member; and attaching the second electrical conductor to the assembly member.

35. The joint according to claim 17, wherein the compliant structure is defined by the surface forming the aperture by which the assembly member and the adapting member can be assembled with an assembly means extending through the aperture.

36. The method of claim 34, wherein the compliant structure is defined by a surface forming an aperture by which the assembly member and the adapting member can be assembled with an assembly means extending through the aperture, wherein the first electrical conductor extends into the aperture.

* * * * *